United States Patent [19]

Suzuki

[11] Patent Number: 5,361,146
[45] Date of Patent: Nov. 1, 1994

[54] LIQUID CRYSTAL DISPLAY PANEL MONITOR

[75] Inventor: Kenji Suzuki, Kanagawa, Japan

[73] Assignee: Fuji Photo Film Co., Ltd., Kanagawa, Japan

[21] Appl. No.: 91,986

[22] Filed: Jul. 16, 1993

[30] Foreign Application Priority Data

Jul. 16, 1992 [JP] Japan ................... 4-189728

[51] Int. Cl.⁵ .............. H04N 1/40; G03F 3/10
[52] U.S. Cl. ..................... 358/527; 345/50;
        345/905; 348/836
[58] Field of Search ........... 358/254, 255, 506, 527,
        358/518; 351/224; 248/410; 355/37, 38;
        345/87, 50, 905; 348/836, 842, 843, 844

[56] References Cited

U.S. PATENT DOCUMENTS

| | | | |
|---|---|---|---|
| 3,564,138 | 2/1971 | Harrold | 358/255 |
| 3,733,436 | 5/1973 | Rose | 358/255 |
| 4,051,535 | 9/1977 | Inglis | 358/255 |
| 4,285,523 | 8/1981 | Lemelson | 358/255 |
| 4,304,385 | 12/1981 | Farouche et al. | 248/410 |
| 4,695,902 | 9/1987 | Wolcott | 358/527 |
| 4,782,390 | 11/1988 | Hayashi et al. | 358/506 |
| 4,854,694 | 8/1989 | Hirano et al. | 351/224 |
| 4,967,266 | 10/1990 | Yamamoto . | |
| 4,969,046 | 11/1990 | Sugimoto et al. | 358/254 |
| 5,057,913 | 10/1991 | Nagata et al. | 358/527 |

Primary Examiner—Alvin E. Oberley
Assistant Examiner—Steven J. Saras
Attorney, Agent, or Firm—Sughrue, Mion, Zinn, Macpeak & Seas

[57] ABSTRACT

An LCD panel monitor having a LCD panel which displays a video image simulating a photographic print which is to be created by the photographic printer. The LCD panel is mounted on a panel frame which is held by a holding portion to permit inclining the panel frame at an appropriate angle. The LCD panel monitor is provided with a sight member and a target mark used for determining a normal eye position of a viewer relative to the LCD panel. In the normal eye position, the viewer can view the video image displayed on the LCD panel in a direction perpendicular to the LCD panel and the image will not be dim or blurred.

8 Claims, 4 Drawing Sheets

LIQUID CRYSTAL DISPLAY PANEL MONITOR

BACKGROUND OF THE INVENTION

1. Field of the Invention

The present invention relates to a liquid crystal display (LCD) panel monitor for displaying a video image simulating a positive image of a photographic print to be created by means of a photographic printer.

2. Description of the Related Art

A photographic printer with a monitor has been disclosed, for example, in U.S. Pat. No. 4,967,266 (corresponding to Japanese Laid-Open Patent Application No. 1-298339), in which an imaging device is incorporated for detecting a video signal from an original frame recorded on a photographic film, so that a video image simulating a finished condition of a photographic print to be made from the original frame is displayed on the monitor to permit inspecting the print position of the original frame as well as the density and color of the finished print.

On the other hand, color LCD panels have recently become readily available due to recent improvements in liquid crystal technology. LCD panels have a small thickness or depth and hence can provide a thin and compact display device as compared with cathode ray tubes. Additionally, LCD panels operate at a low voltage and thus consume less electrical power. Because of these advantages, such an LCD panel would be preferable as a monitor for a photographic printer.

However, the contrast of an image displayed on the LCD panel varies depending upon the direction from which the panel is observed, that is, the position of the viewer relative to the panel. Therefore, the viewer must fix the position of his/her eyes at a predetermined angle relative to the panel front surface. Otherwise the image on the panel will not be bright or will look burred. For this reason, it is necessary, when using an LCD panel as a simulation monitor of a photographic printer, to determine a normal eye position where the image has no color blur. However, because each person has a different physical constitution, a fixed standing position does not always define an optimum eye position for everybody. Accordingly, such an LCD panel monitor for a photographic printer would have to be adjusted for each individual viewer.

SUMMARY OF THE INVENTION

In view of the foregoing, an object of the present invention is to provide an LCD panel monitor which displays a simulated image of a photographic print, wherein a normal or optimum eye position can be easily determined.

To achieve the above and other objects and advantages, the present invention provide an LCD panel monitor having an LCD panel, a panel frame supporting the LCD panel on a front thereof, and a positioning device for determining a normal eye position of a viewer relative to the LCD panel. The normal eye position is where the viewer can view the video image displayed on the LCD panel with optimum brightness and clarity.

According to an embodiment of the present invention, the positioning device is comprised by a sight member having a sighting hole and disposed in front of the LCD panel, and a target mark disposed in a front portion of the panel frame. In this embodiment, when the viewer is in the normal eye position, the target mark is displayed on the LCD panel.

According to another embodiment of the present invention, the positioning device has an arm secured to the panel frame and a jaw pad provided on a free end of the arm and having a recessed portion upon which a jaw of the viewer is placed.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein.

DETAILED DESCRIPTION OF THE PREFERRED EMBODIMENTS

Figure 1:
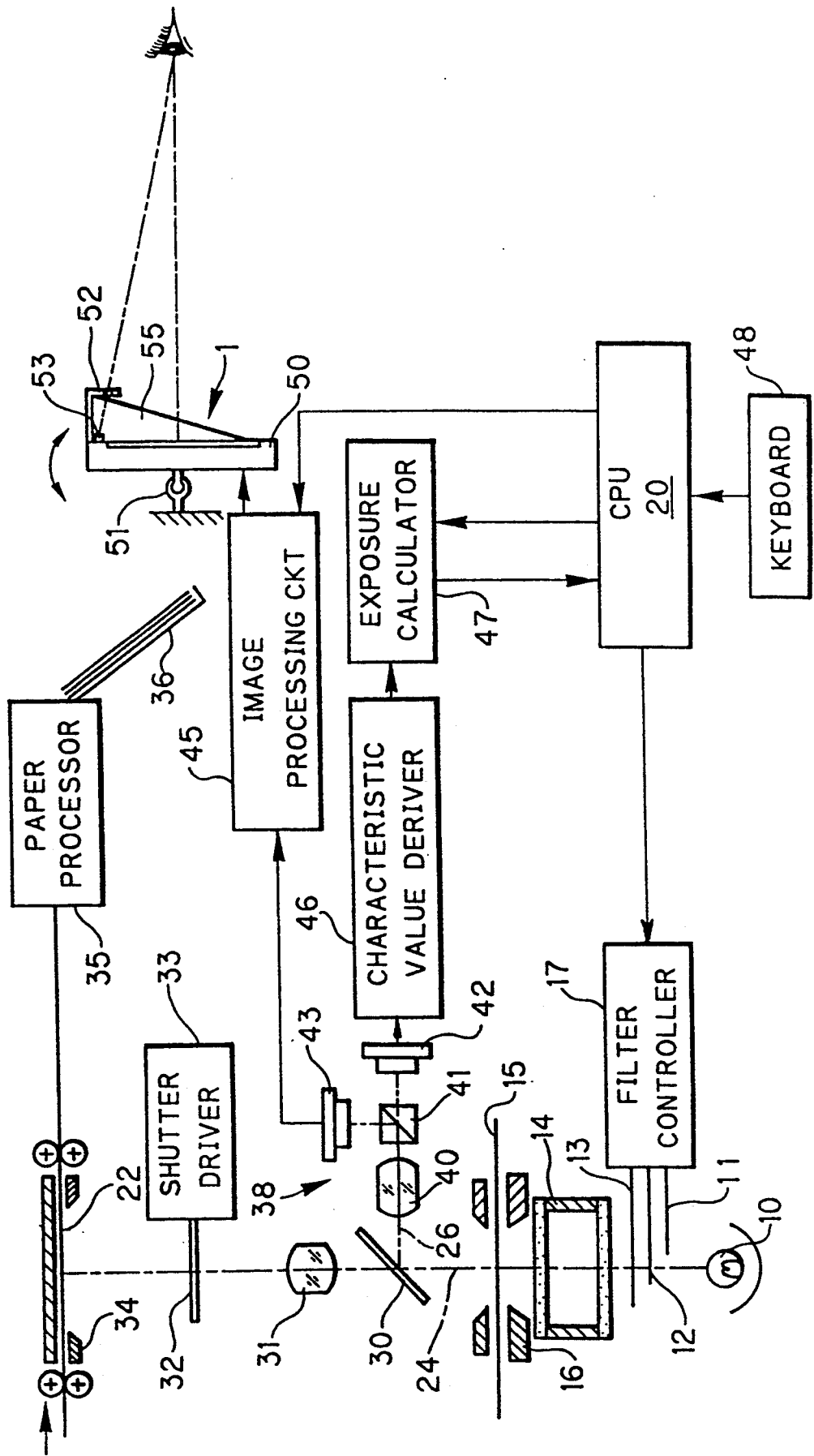
FIG. 1 schematically shows a photographic printer with an LCD panel monitor according to a preferred embodiment of the invention.

FIG. 1 shows an example of a photographic printer having an LCD panel monitor 1 according to the first preferred embodiment of the present invention. In the photographic printer, printing light projected from a light source 10 travels through three color filters 11-13 and a mixing box 14, and then illuminates an original frame to be printed which is recorded on a photographic film 15 which is set in a film carrier 16. The respective color filters 11-13 are insertable into the printing light path 24. The amount of insertion is adjusted by a filter controller 17 which is controlled by a CPU 20. The CPU 20 also controls the position of the original frame to be printed, with respect to the printing light path 24.

Disposed in the printing light path 24, sequentially from the photographic film 15 to a photographic paper 22, are a half-mirror 30, a zoom lens 31 and a shutter 32. The shutter 32 is driven by a shutter driver 33, and the zoom lens 31 is driven by motor (not shown), both under the control of the CPU 20. A variable paper mask device 34 is disposed before a print position of the photographic paper 22. The paper mask device adjusts a print-exposure aperture to correspond to a designated print size. A portion of the photographic paper 22 which has been exposed, is developed and finished in a paper processor 35 and, thereafter, cut into an individual photographic prints to be ejected onto a tray 36.

The half-mirror 30 reflects a portion of the printing light toward an imaging and light-measuring section 38. Alternatively, a movable mirror may be diagonally inserted in the printing light path 24 during the imaging and light-measuring. The movable mirror can be constructed to pivot or slide into and out of the printing light path 24.

The imaging and light-measuring section 38 includes a zoom lens 40, a beam splitter 41, a first color image sensor 42 which detects light values of the original frame to be printed, for use in determining a print-exposure, and second color image sensor 43 which detects the projected light and generates a video signal representing the original frame. The beam splitter 41 partly passes and partly reflects the light 26 reflected from the half-mirror 30. That is, the light 26 is directed partly toward the first color image sensor 42 and partly toward the second color image sensor 43. The first and second color image sensors 42 and 43 are, for example, MOS image sensors or CCD image sensors. The zoom lens 40 is adjusted such that an image of the original frame is formed in the same size on both of the first and second color image sensors 42 and 43 even when the size of the original frame varies according to the film type.

The video signal from the second color image sensor 43 is sent to an image processing circuit 45, to be processed in accordance with the properties of the photographic paper 22. The processed video signal is sent to the color LCD panel monitor 1, to display a video image simulating a finished condition of a photographic print to be made from the original frame. It is also possible to display photographic data such as positioning marks, the designated print size and a desirable print magnification, and/or another image in combination with the video image. The detailed description of the display of such a simulated image or other images and data is disclosed in the above-mentioned U.S. Pat. No. 4,967,266.

The first color image sensor 42 performs three color separation measurements at each measuring point of the original frame to be printed, and sends the detected light values to a characteristic value deriver 46. The characteristic value deriver 46 derives various characteristic values of the original frame, such as a large area transmittance density (LATD), a maximum density, a minimum density, and so forth, from the light values, and sends the characteristic values to an exposure calculator 47. The exposure calculator 47 calculates a basic print-exposure based on the characteristic values by using conventional exposure calculation formulas.

The basic print-exposure and the image processing circuit 45 are sent to the CPU 20. Thereby, the simulated video image displayed on the color LCD panel monitor 1 is corrected in accordance with the basic print-exposure. A keyboard 48 is connected to the CPU 20 for entering printer control commands, film positioning data, exposure correction data, and other data. If any exposure correction data is entered through the keyboard 48 with reference to the simulated video image, the CPU 20 calculates a print-exposure based on the exposure correction data and the basic print-exposure, and drives the filter controller 17 to adjust the color balance and the intensity of the printing light according to the print-exposure. As a result, the color LCD panel monitor 1 displays a video image simulating a finished condition of the photographic print that will be obtained at the corrected print-exposure.

Figure 2:
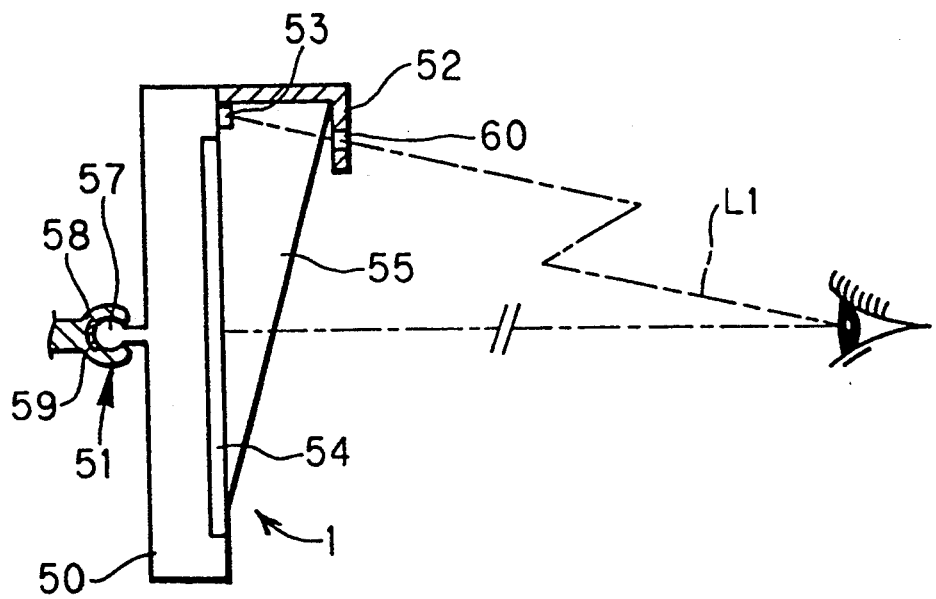
FIG. 2 is a side view of the LCD panel monitor, partly in section, of FIG. 1.
Figure 3:
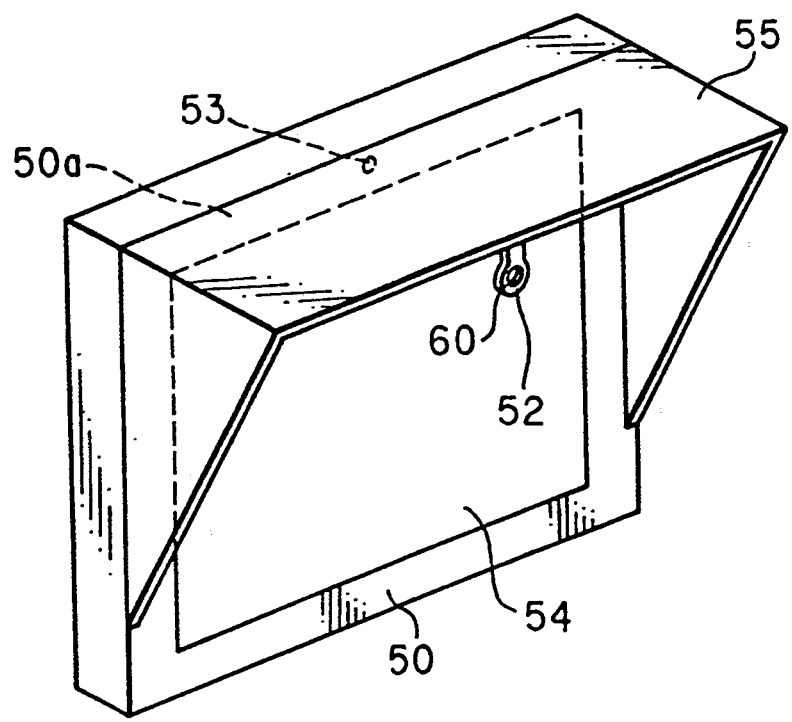
FIG. 3 is a perspective front view of the LCD panel monitor of FIG. 1.

Referring to FIGS. 2 and 3, the LCD panel monitor 1 of the present invention has a panel frame 50, a holder portion 51 for holding the panel frame 50, a sight member 52, and a target mark 53 for indicating, in combination with the sight member 52, a normal eye position of a viewer relative to the LCD panel monitor 1. The normal eye position is where the operator can view an LCD panel 54 mounted on the front of the panel frame 50 from a direction which is perpendicular to the front surface of the LCD panel 54, so that the viewer can inspect the video image on the LCD panel 54 properly. A shading member 55 is mounted on the top and lateral sides of the panel frame 50 to shade the LCD panel 54 from extraneous light.

As shown in FIG. 2, the holder portion 51 is constructed as a ball-and-socket joint consisting of a ball shaft secured to the panel frame 50, a spherical socket 58 for receiving the round end of the ball shaft, and a pressing portion 59. The ball-and-socket joint allows the operator to rock the panel frame 50 relative to a vertical plane when determining a desirable angle of the LCD panel 54. The pressing portion 59 pushes the round end of the ball shaft 57 to frictionally maintain the panel frame 50 in position. The holder portion 51 need not be constructed as a ball-and-socket joint; rather any conventional holding device is applicable as long as the holding device allows the desired movement of the panel frame 50.

As shown in FIG. 3, the sight member 52 is disposed in a center position of the top front edge of the shading member 55, and extends downward therefrom. A sighting hole 60 is formed at the tip of the sight member 52. The target mark 53 is disposed in a center position of the upper front portion 50a of the panel frame 50, such that a viewer can see the target mark 53 through the sighting hole 60 when the viewer is in the proper viewing position relative to the LCD panel 54, as is indicated by a line L1. The target mark 53 may be adhered to or printed on the panel frame.

The operation of the above-described photographic printer with the color LCD panel monitor 1 is as follows:

First, the operator sits in a predetermined working position, and moves the panel frame 50 about the holding portion 51 to adjust the sighting hole 60 of the sight member 52 to the target mark 53. When the panel frame 50 is moved in a position where the operator can see the target mark 53 through the sighting hole 60, the operator is in the proper viewing position relative to the color LCD panel monitor 1, wherein the face of the operator is right in front of the LCD panel 54 and, therefore, the operator views the video image in a direction perpendicular to the front surface of the LCD panel 54. In this way, diagonal viewing of the LCD panel 54 is prevented, so that the operator can inspect the simulative video image accurately without color-blur or loss of brightness.

If it is determined in result of the inspection of the simulated video image on the color LCD panel monitor 1 that a finished photographic print to be made from the original frame set in the film carrier 16 needs color and/or density correction, the keyboard 48 is operated to enter the desired color and/or density correction data. The CPU 20 calculates a corrected print-exposure on the basis of this correction data, and corrects the color balance and/or density of the printing light correspondingly by adjusting the insertion of at least one of the three color filters 11–13 into the printing light path 24 using the filter controller 17. As a result, the color LCD panel monitor 1 displays a corrected condition of the photographic print.

When a print start key of the keyboard 48 is actuated by the operator after confirming if the corrected condition of the photographic print and the position of the original frame are proper, the CPU 20 drives the shutter driver 33 to print an image of the original frame onto the photographic paper 22. If the corrected condition is still unsatisfactory, further correction data is entered through the keyboard 48. Thus, exposure correction and inspection are repeated in the same manner as described above by using the displayed simulated video image, until a satisfactory condition of the photographic print is obtained.

Even if the operator of the device is changed, or if the operator assumes a different posture, the operator can easily adjust the position of the panel 54 so that the target mark 53 is viewable through the sighting hole 60, so that the operator can view the LCD panel 54 at a proper angle.

Figure 4:
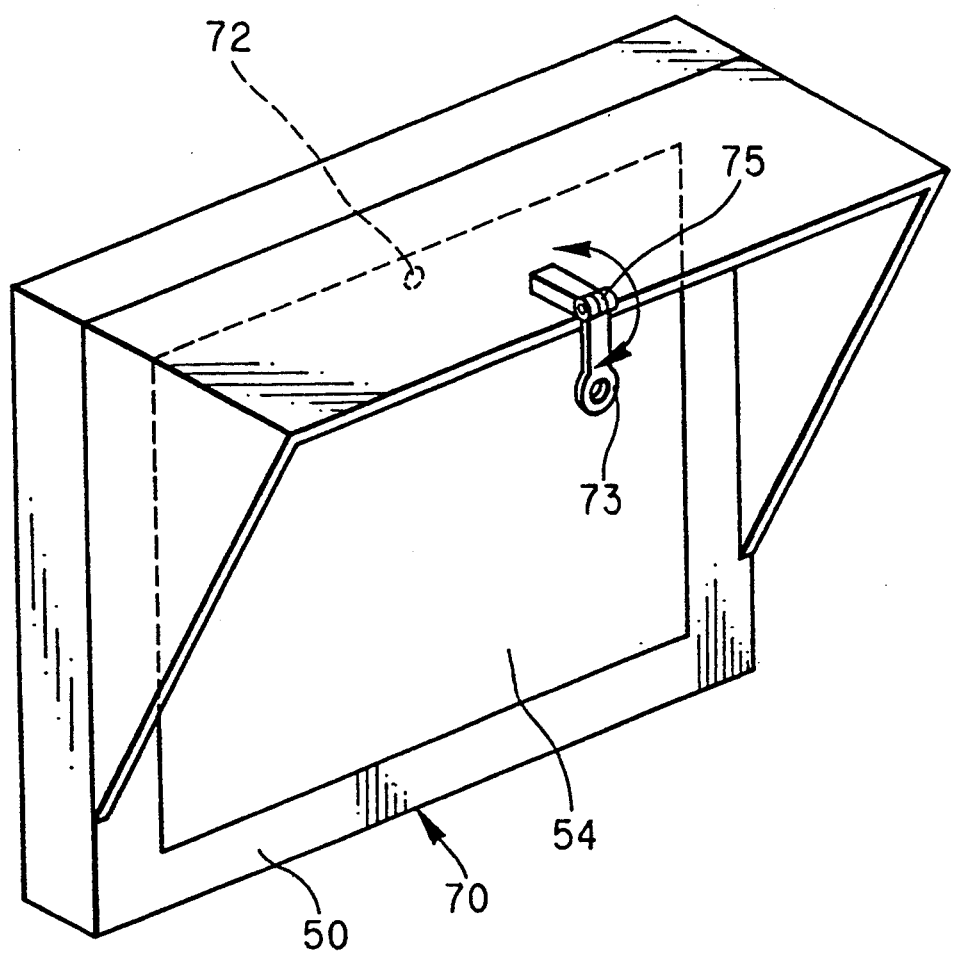
FIG. 4 is a perspective front view of an LCD panel monitor according to a second preferred embodiment of the present invention.

Although the target mark 53 is fixedly disposed on the panel frame 50 in the above-described embodiment, it is also possible to display a target mark 72 as an image on an LCD panel 54 of a color LCD panel monitor 70, as is shown in FIG. 4. In this modification, sight member 73 is preferably hinged to a top wall portion of a shading member 55 by means of a hinge 75 such that the sight member 73 can pivot from a sighting position shown in FIG. 4 to a retracted position on the top wall portion of the shading member 55. It is to be noted that equivalent elements are designated by the same reference numeral as the above-described embodiment, so that the detailed description of these elements can be omitted.

Figure 5:
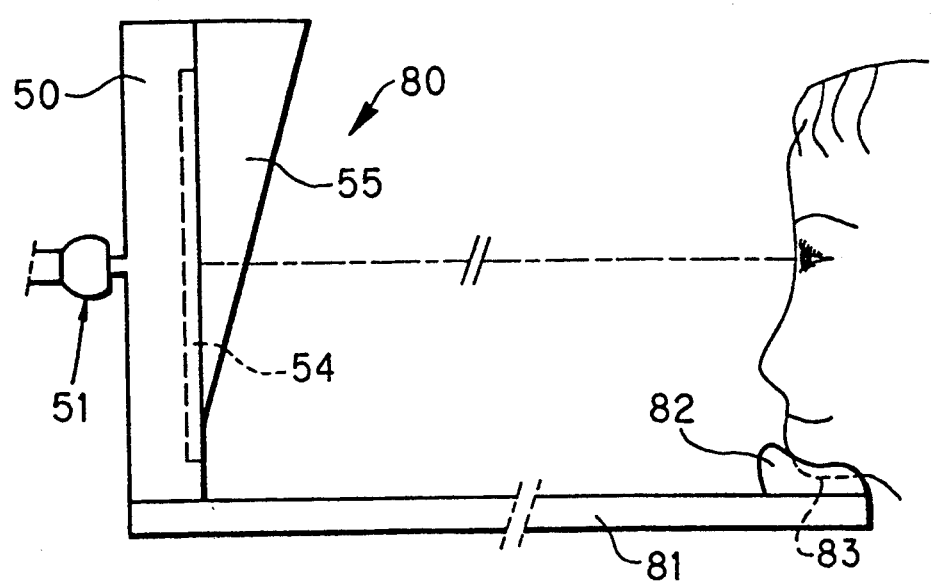
FIG. 5 is a side view of an LCD panel monitor according to a third preferred embodiment of the present invention.
Figure 6:
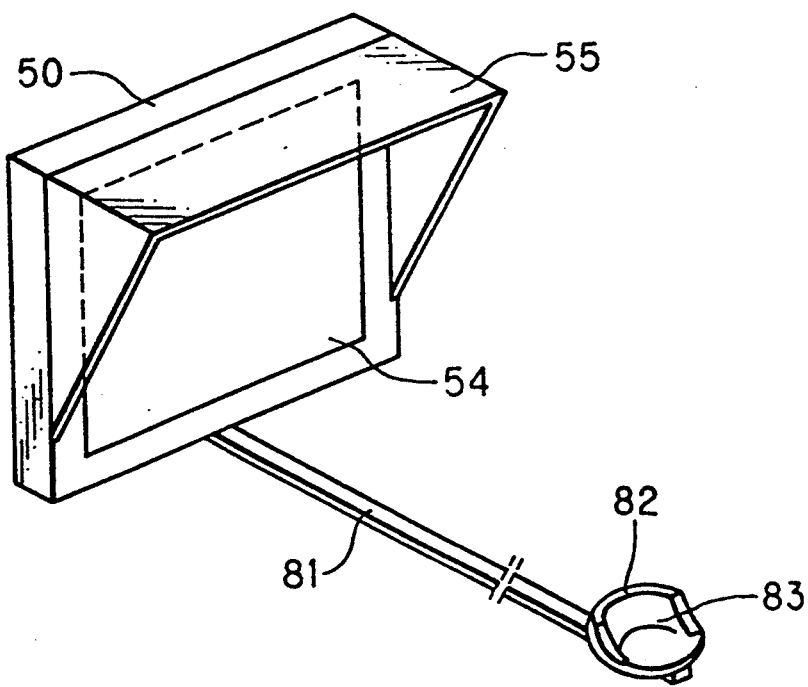
FIG. 6 is a front perspective view of the LCD panel monitor of FIG. 5.

A color LCD panel monitor 80 shown in FIGS. 5 and 6 has an arm 81 with a jaw pad 82 on a free end thereof, for fixing the operator's eye position relative to a LCD panel 54, instead of the sight members 52 and 73. The jaw pad 82 has a recessed portion 83, on which the operator's jaw placed. Thereby, the position of the face of the operator is fixed to position the operator's eyes directly in front of the LCD panel 54. The arm 81 may have a foldable construction to permit stowing the arm 81 under the color LCD panel monitor 80. Also, in the embodiment shown in FIGS. 5 and 6, equivalent elements are designated by the same reference numeral as the above-described embodiment, and the detailed description of these elements is omitted.

It is possible to mount non-lens spectacles or the like in place of the jaw pad 82 for fixing the operator's eye position. The arm 81 may be attached directly to a photographic printer if the photographic printer has an LCD panel monitor that is fixedly mounted to the housing of the photographic printer so that an angle of the panel monitor is unchangeable.

Although the proper eye position of the above-described embodiment is where a straight line from a center of the LCD panel to eyes of the viewer is oriented in a direction perpendicular to the panel surface, it is possible to predetermine the optimum eye position of the viewer in another way.

The LCD panel monitor of the present invention is applicable to a video-type photographic film analyzer or negative inspector, in addition to the application in a photographic printer.

While the present invention has been described in detail above with reference to a preferred embodiment shown in the drawings, it will be apparent to those skilled in the art that various changes and modifications of the present invention are possible without departing from the scope of the invention as defined by the appended claims.

What is claimed is:

1. A liquid crystal display panel monitor for displaying a video image simulating a photographic print to be made by a photographic printer, said liquid crystal display panel monitor comprising:
   a liquid crystal display panel for displaying said video image thereon;
   a panel frame on which said liquid crystal display panel is mounted; and
   positioning means connected to said liquid crystal display panel for determining a desired eye position of a viewer relative to said liquid crystal display panel said positioning means comprises a sight member having a sighting hole and disposed in front of said liquid crystal display panel, and a target mark disposed on a front portion of said panel, said target mark and sighting hole are relatively positioned so that when the viewer can see said target mark through said sighting hole, the viewer is in said desired eye position.

2. A liquid crystal display panel monitor as recited in claim 1, further comprising a shading member disposed proximate said liquid crystal display panel for blocking extraneous light.

3. A liquid crystal display panel monitor as recited in claim 2, further comprising:
   a holding device on which said panel frame is movably mounted to permit inclining said liquid crystal display panel in various directions at an appropriate angle.

4. A liquid crystal display panel monitor as recited in claim 3, wherein said holding device comprises a shaft secured to a back of said panel frame and having a round end, a spherical socket secured to said photographic printer for receiving said round end of said shaft and a pressing member which presses said round end in said spherical socket to frictionally fix said panel frame in an inclined position.

5. A liquid crystal display panel monitor as recited in claim 4, wherein said shading member includes a top wall portion secured to and extending forward from a top side of said panel frame, and wherein said sight member is mounted to said top wall portion of said shading member and protrudes downward from said top wall portion.

6. A liquid crystal display panel monitor as recited in claim 3, wherein said and a target mark is an image optionally displayed on said liquid crystal display panel.

7. A liquid crystal display panel monitor as recited in claim 6, wherein said shading member includes a top wall portion secured to and extending forward from a top side of said panel frame, and wherein said sight member is mounted to said top wall portion of said shading ember and protrudes downward from said top wall portion.

8. A liquid crystal display panel monitor as recited in claim 7, wherein said sight member is hinged to a front edge of said top wall portion, and can be pivotally retracted onto said top wall portion.

* * * * *